(12) United States Patent
Hou

(10) Patent No.: US 11,230,922 B2
(45) Date of Patent: Jan. 25, 2022

(54) FRACTURE INTERPRETATION WITH RESISTIVITY AND SONIC LOGS IN BIAXIAL ANISOTROPIC FORMATIONS

(71) Applicant: Halliburton Energy Services, Inc., Houston, TX (US)

(72) Inventor: Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 594 days.

(21) Appl. No.: 15/777,751

(22) PCT Filed: Jan. 20, 2016

(86) PCT No.: PCT/US2016/014003
§ 371 (c)(1),
(2) Date: May 21, 2018

(87) PCT Pub. No.: WO2017/127058
PCT Pub. Date: Jul. 27, 2017

(65) Prior Publication Data
US 2018/0334901 A1    Nov. 22, 2018

(51) Int. Cl.
*G06G 7/48*     (2006.01)
*E21B 49/00*    (2006.01)
(Continued)

(52) U.S. Cl.
CPC .......... *E21B 49/00* (2013.01); *E21B 41/0092* (2013.01); *E21B 47/002* (2020.05);
(Continued)

(58) Field of Classification Search
CPC .......... G01V 3/38; G01V 3/32; G01V 99/005; G01V 1/306; G01V 3/12; G01V 2210/66;
(Continued)

(56) References Cited

U.S. PATENT DOCUMENTS

2004/0001388 A1    1/2004  Kriegshauser et al.
2004/0100263 A1*   5/2004  Fanini ................ G01V 3/28
                                                 324/339
(Continued)

FOREIGN PATENT DOCUMENTS

WO   WO 2015/149237 A1   10/2015
WO   WO 2015/161282 A1   10/2015

OTHER PUBLICATIONS

Hou et al. Characterization of Formation Fractures With Multicomponent Induction Loggin Based on Biaxial Anisotropy Models: Method and Case Studies Society of Petrophysicists and Well-Log Analysts, Jan. 1, 2015 (Year: 2015).*

(Continued)

*Primary Examiner* — Justin C Mikowski
*Assistant Examiner* — Cuong V Luu
(74) *Attorney, Agent, or Firm* — Haynes and Boone, LLP

(57) ABSTRACT

Evaluation of formation and fracture characteristics based on multicomponent induction (MCI) and multipole sonic logging (MSL) data includes automated calculation of inverted biaxial anisotropy (BA) parameters for the formation by performing an iterative BA inversion operation based on the MCI log data and using a BA formation model that accounts for transfers by axial formation anisotropy to resistivity. The inverted BA parameters and the processed MSL data can be used, in combination, to calculate a quantified value for an identification function, to indicate estimated presence or absence of a fracture in the formation.

16 Claims, 9 Drawing Sheets

(51) Int. Cl.
*G01V 1/50* (2006.01)
*G01V 3/38* (2006.01)
*G01V 3/18* (2006.01)
*G01V 11/00* (2006.01)
*G01V 1/30* (2006.01)
*E21B 47/002* (2012.01)
*E21B 41/00* (2006.01)
*G01V 3/28* (2006.01)
*E21B 43/26* (2006.01)

(52) U.S. Cl.
CPC ............... *G01V 1/301* (2013.01); *G01V 1/50* (2013.01); *G01V 3/18* (2013.01); *G01V 3/28* (2013.01); *G01V 3/38* (2013.01); *G01V 11/00* (2013.01); *E21B 43/26* (2013.01); *G01V 2210/646* (2013.01)

(58) Field of Classification Search
CPC .... G01V 2200/16; G01V 1/345; G01V 5/107; G01V 1/28
See application file for complete search history.

(56) References Cited

U.S. PATENT DOCUMENTS

| | | | |
|---|---|---|---|
| 2005/0256645 | A1 | 11/2005 | Rabinovich et al. |
| 2008/0215243 | A1* | 9/2008 | Rabinovich .............. G01V 3/28 702/7 |
| 2009/0065252 | A1* | 3/2009 | Moos ...................... E21B 47/08 175/50 |
| 2009/0109794 | A1* | 4/2009 | Sinha .................... E21B 49/006 367/35 |
| 2010/0004866 | A1* | 1/2010 | Rabinovich .............. G01V 3/28 702/7 |
| 2011/0042080 | A1 | 2/2011 | Birchwood et al. |

OTHER PUBLICATIONS

Hou et al. Real-Time Borehole Correction For A New Multicomponent Array Induction Logging Tool in OBM Wells SPWLA 53rd Annual Logging Symposium, Jun. 2012 (Year: 2012).*
Hou et al. Characterization of Formation Fractures With Multicomponent Induction Loggin Based on Biaxial Anisotropy Models: Method and Case Studies SPWLA (Year: 2015).*
Canady, W. et al., 2005, Permeability estimation from Stoneley amplitude, corrected for borehole geometry and rugosity: SPE 96598.
Georgi, D. et al., 2008, Biaxial Anisotropy: Its occurrence and measurement with multicomponent induction tools: SPE 114739.
Guha, R. et al., 2006, Integrating multi-sensor acoustic and resistivity data for improved formation evaluation in the presence of drilling induced fractures: SPWLA 47th Annual Logging Symposium, paper III.
Hou, J. et al., 2013, A new multi-frequency triaxial array induction tool for enhancing evaluation of anisotropic formations and field testing: SPWLA 54th Annual Logging Symposium, paper CCC.
International Search Report and The Written Opinion of the International Search Authority, or the Declaration, dated Sep. 12, 2016, PCT/US2016/014003, 15 pages, ISA/KR.
Manescu, A. et al., 2010, An anisotropy study: Integrated interpretation of shear wave and resistivity anisotropy in an offshore field in India: SPE 128446.
Patterson, D. et al., 2013, Unconventional reservoir fracture evaluation utilizing deep shear-wave imaging: IPTC in Beijing, paper 16958.
Tang, X. et al., 1993, Borehole Stoneley wave propagation across permeable structures: Geophysical Prospecting, 41, No. 2, 165-187.
Tang, X. et al., 2011, Integrated acoustic evaluation of reservoir fractures: from borehole out into the formation: Petrophysics, 52, 199-206.
Tang, T. et al., Quantitative Borehole acoustic methods: Elsevier.
Wang, T. et al., 2005, Characterizing fractures with multicomponent induction measurements: Petrophysics, 46, 42-51.
Wu, P. et al., 2013, Fracture characterization using triaxial induction tools: SPWLA 54th Annual Logging Symposium, paper CC.

* cited by examiner

FRACTURE INTERPRETATION WITH RESISTIVITY AND SONIC LOGS IN BIAXIAL ANISOTROPIC FORMATIONS

PRIORITY

The present application is a U.S. National Stage patent application of International Patent Application No. PCT/US2016/014003, filed on Jan. 20, 2016, the benefit of which is claimed and the disclosure of which is incorporated herein by reference in its entirety.

BACKGROUND

Modern operations for the exploration and production of oil and gas rely on access to a variety of information regarding subsurface geological parameters and conditions. Such information typically includes characteristics of Earth formations traversed by a borehole, as well as data relating to the size and mud of the borehole itself. The collection of information relating to subsurface conditions, which is commonly referred to as "logging," can be performed by several methods, including wireline logging and logging while drilling (LWD).

In wireline logging, a sonde is lowered into the borehole after some or all of the well has been drilled. The sonde hangs at the end of a wireline cable that provides mechanical support to the sonde and also provides an electrical connection between the sonde and electrical equipment located at the surface. In accordance with existing logging techniques, various parameters of the Earth's formations are measured and correlated with the position of the sonde in the borehole as the sonde is pulled uphole. In LWD, a drilling assembly includes sensing instruments that measure various parameters as the formation is penetrated, thereby enabling measurement of the formation during the drilling operation.

Among the available wireline and LWD tools are a variety of logging tools including devices configured for taking multicomponent induction (MCI) and multipole sonic logging (MSL) measurements. Fractures in the formation can be characterized using such measurements. However, non-fracture information can lead to uncertainty in fracture characterization.

BRIEF DESCRIPTION OF THE DRAWINGS

Some embodiments are illustrated by way of example and not limitation in the figures of the accompanying drawings in which.

DETAILED DESCRIPTION

Figure 1:
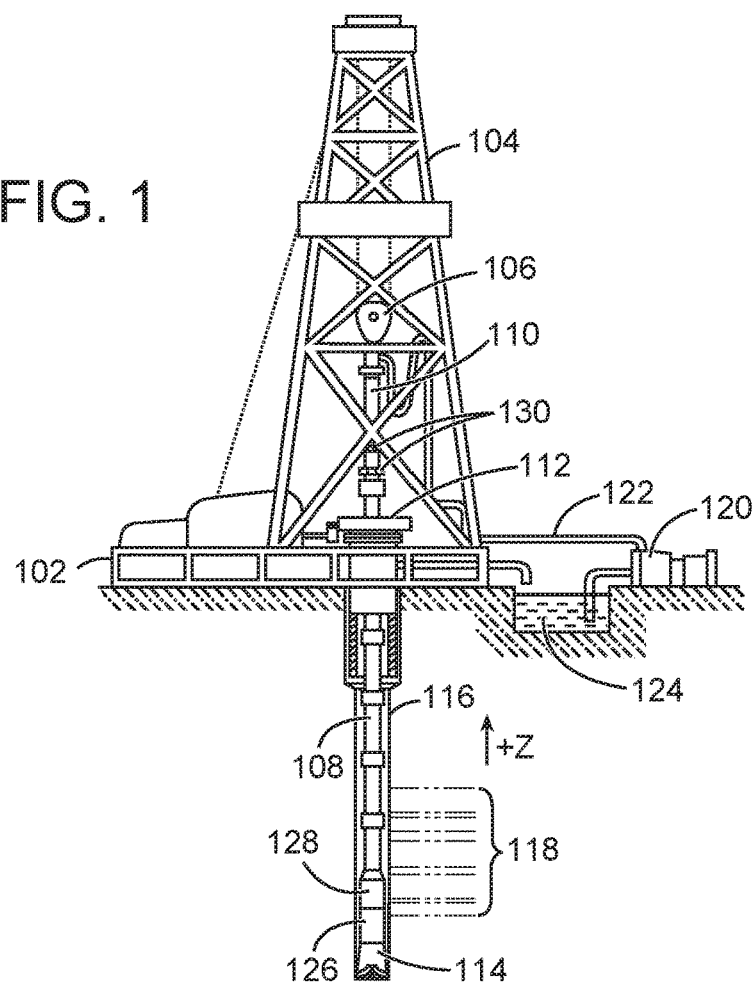
FIG. 1 is a schematic view of a system for capturing subsurface measurement data in a logging while drilling operation, according to one or more example embodiments.

The following detailed description refers to the accompanying drawings that depict various details of examples selected to show how aspects of this disclosure may be practiced. The discussion addresses various examples of the disclosed subject matter at least partially in reference to these drawings, and describes the depicted embodiments in sufficient detail to enable those skilled in the art to practice the subject matter disclosed herein. Many other embodiments may be utilized for practicing the disclosed subject matter other than the illustrative examples discussed herein, and structural and operational changes in addition to the alternatives specifically discussed herein may be made without departing from the scope of the disclosed subject matter.
Introduction Different types of fractures are often present in subsurface formations. For example, natural fractures occur in different types of subsurface reservoir formations due to structural movements (e.g., unbalanced stress distribution) over geological time. The fractures provide conduits for the flow of oil and gas into wellbores, which impact formation properties such as porosity and permeability. Therefore, fracture characterization can be used to provide information for hydrocarbon exploration, development and production.

Both multipole sonic logging (MSL) and multicomponent induction (MCI) logging have been used for fracture characterization. For example, in MCI logging, formation resistivity (or conductivity, which is inversely related to resistivity) shows azimuthal anisotropy of horizontal resistivity in a bedding plane of fractured formations. Unless the text or context clearly indicates otherwise, "horizontal" or "transverse" means a direction or plane substantially coinciding with a bedding plane of the relevant formation, and "vertical" means a direction of plane substantially orthogonal to the bedding plane of the relevant formation. For multipole sonic logging (e.g., consisting of both monopole and cross-dipole sonic transmitter and receiver systems), natural and induced fractures are able to produce the azimuthal shear velocity anisotropy around the borehole.

Accurate estimation of fracture characteristics can promote successful development of a tight, heavily fractured reservoir, as the fractures play a significant role for both reservoir fluid flow and well productivity.

MCI and MSL processing and interpretation can be based at least in part on a biaxially anisotropy (BA) formation model. Processing and interpretation of MCI and MSL measurement data may thus be performed based at least in part on BA parameterization, resulting in more accurate description of complex anisotropic formations than is the case based on transversely isotropic (TI) model-based processing. The TI formation model is a model that represents simulated formation resistivity characteristics accounting for transverse formation isotropy to resistivity. The TI model can account for resistivity differences between orthogonal axes lying in a formation or bedding plane (e.g., the horizontal or transverse plane) and an axis perpendicular to the formation or bedding plane (e.g., the vertical axis). Thus, the TI model accounts for anisotropy between the vertical axis and the horizontal plane, but assumes isotropy between different axes in the horizontal plane. The BA model additionally accounts for anisotropy between orthogonal axes in the transverse plane. One or more example embodiments described below provide a fast and practical method and system for joint MCI and MSL data processing for identifying and quantifying formation fractures.

Fracture evaluation with MCI/MSL data and measurement logs can be inverted based at least in part on the BA formation model also. Description of example embodiments that follow thus describe an inversion process based on the BA-model, detection of fracture existence using an identification (ID) function based on the inverted formation parameters and/or on MCI/MSL measurement data, and one or more methods for estimation of fracture azimuth and relative dip. One or more of these parameters may be used to define an identification (ID) function for automated detection of fracture existence. Some embodiments further comprising estimating fracture azimuth and dip in an automated operation based on the calculated principal y/x-axis azimuth and formation relative dip.

Some implementations of the disclosed example embodiments can provide improved accuracy in recovery of formation parameters (e.g., anisotropic parameters and dip), and of provision of parameters for use in automated fracture estimation (including fracture identification and quantification).

Example Measurement Environments

FIG. 1 is a schematic illustration of an example logging while drilling (LWD) environment. A drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, it creates a borehole 116 that passes through various formations 118. A pump 120 circulates drilling fluid through a supply pipe 122 to top drive 110, down through the interior of drill string 108, through orifices in drill bit 114, back to the surface via an annulus around drill string 108, and into a retention pit 124. The drilling fluid transports cuttings from the borehole 116 into the pit 124 and aids in maintaining the integrity of the borehole 116. Various materials can be used for drilling fluid, including a salt-water based conductive mud.

An assembly of LWD tools 126 is integrated into a bottom-hole assembly (BHA) near the bit 114. As the bit 114 extends the borehole 116 through the formations 118, LWD tools 126 collect measurements relating to various formation properties as well as the tool orientation and various other drilling conditions. The LWD tools 126 may take the form of a drill collar, i.e., a thick-walled tubular that provides weight and rigidity to aid the drilling process. In various example embodiments, the LWD tools 126 include a multi-array triaxial induction tool to measure formation resistivity and deliver MCI measurement data (also referred to as "log data"), such as described further herein. Further, the LWD tools 126 can include a sonic logging tool to measure and deliver MSL data. A telemetry sub 128 may be included to transfer images and measurement data to a surface receiver 200 and to receive commands from the surface. In some embodiments, the telemetry sub 128 does not communicate with the surface, but rather stores logging data for later retrieval at the surface when the logging assembly is recovered.

Figure 2:
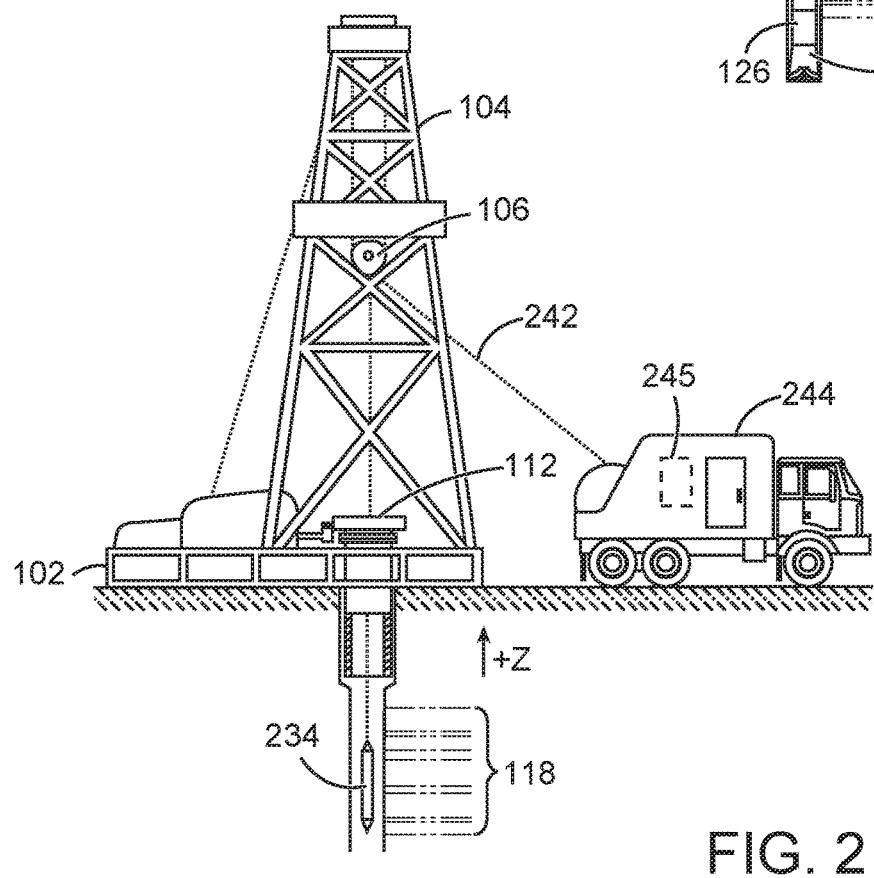
FIG. 2 is a schematic view of a system for capturing subsurface measurement data in a wireline logging operation, according to one or more example embodiments.

At various times during (or after) the drilling process, the drill string 108 may be removed from the borehole 116 as shown in FIG. 2. Once the drill string 108 has been removed, logging operations can be conducted using a wireline logging sonde 234, i.e., a probe suspended by a cable 242 having conductors for conducting power to the sonde 234, and for transmitting telemetry data from the sonde 234 to the surface. The example wireline logging sonde 234 may have pads and/or centralizing springs to maintain the sonde 234 near the central axis of the borehole 116 as sonde 234 is pulled uphole. The logging sonde 234 can include a variety of sensors including a multi-array triaxial induction tool for measuring formation resistivity and providing MCI measurement data. Further, the logging sonde 234 can include a sonic logging for measuring and providing MSL data. A logging facility 244 collects measurements from the logging sonde 234, and includes a computer system 245 for processing and storing the measurements gathered by the sensors.

Figure 3:
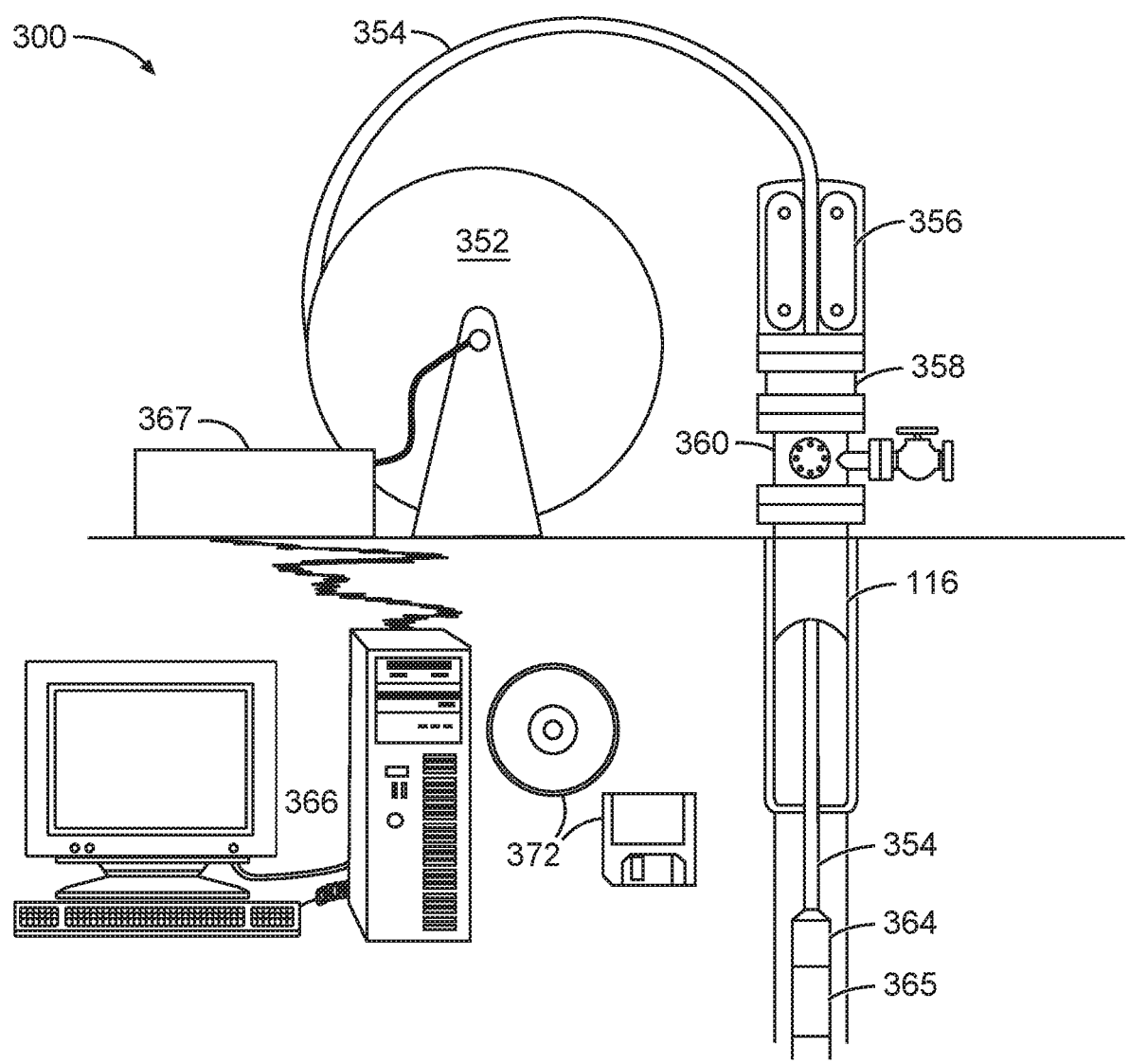
FIG. 3 is a schematic view of a coil tube logging system for capturing subsurface measurement data, according to one or more example embodiments.

Yet a further alternative logging technique is schematically illustrated in FIG. 3, which shows an example embodiment of a coil tubing logging system 300. In system 300, coil tubing 354 is pulled from a spool 352 by a tubing injector 356 and injected through a packer 358 and a blowout preventer 360 into the borehole 116. In the borehole 116, a supervisory sub 364 and one or more logging tools 365 are coupled to the coil tubing 354 and configured to communicate to a surface computer system 366 via information conduits or other telemetry channels. An uphole interface 367 may be provided to exchange communications with the supervisory sub 364 and receive data to be conveyed to the surface computer system 366.

Surface computer system 366 is configured to communicate with supervisory sub 364 to set logging parameters and collect logging information from the one or more logging tools 365. Surface computer system 366 is configured by software (shown in FIG. 3 as being stored on example embodiments of removable storage media 372) to monitor and control downhole instruments 364, 365. The surface computer system 366 may be a computer system such as that described further herein.

Forward Models and their Libraries

Forward modeling includes a numerical solution of Maxwell's equation in a mathematical boundary value problem, where the relevant formation or model specifies boundaries and shapes of regions of different resistivity. Processes for deriving formation parameters from a set of given field logs is known as inverse modeling, and typically comprises iteratively adjusting selected formation parameters in one or more layers of a formation model, and repeating forward modeling (e.g., by and the calculation or with reference to pre-calculated library data), until the observed field logs are satisfactorily replicated, e.g. until a set of variable borehole parameters is found for a best fit with the observed log data based on the applicable formation model.

Figure 4:
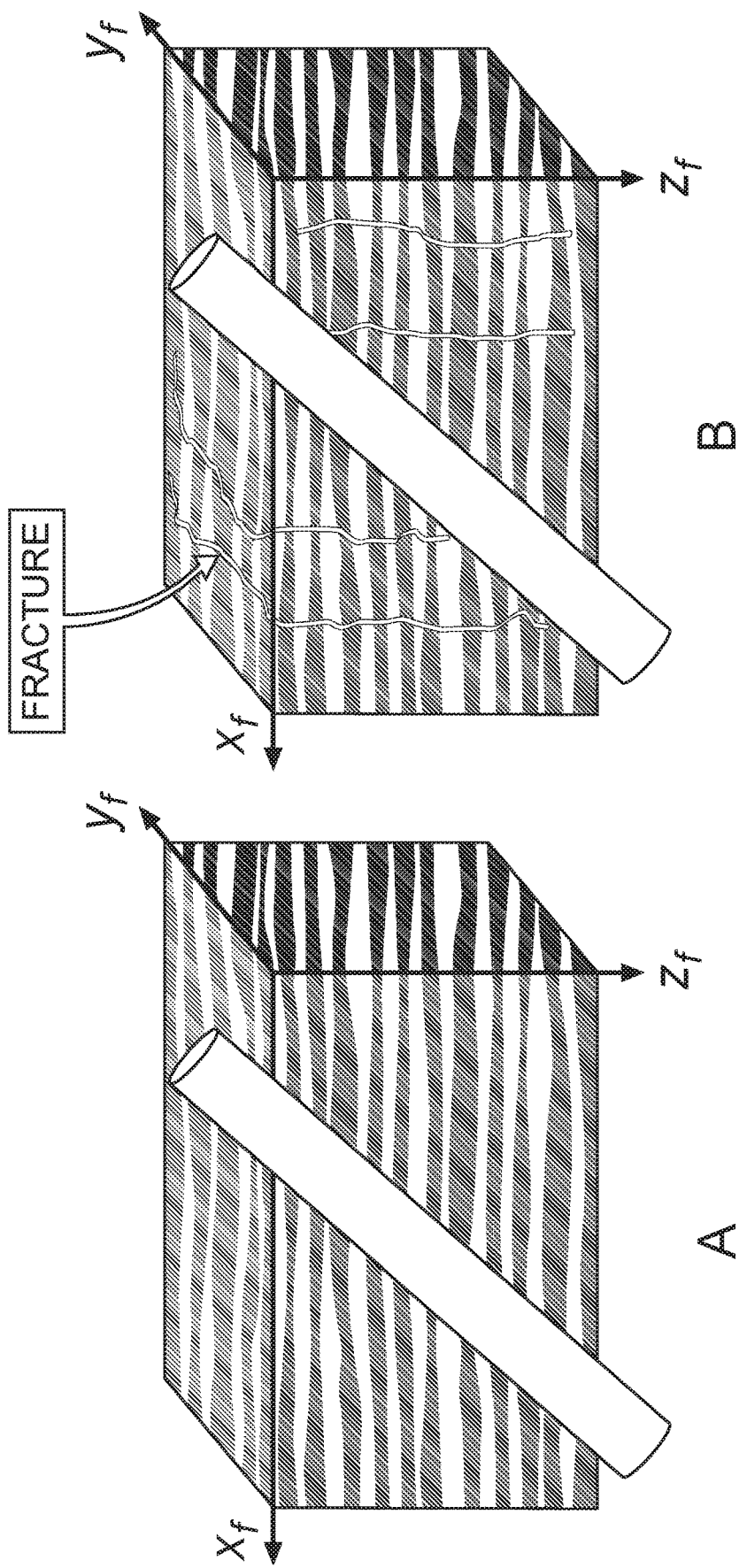
FIG. 4 is a schematic diagram of formation models, according to one or more example embodiments.

Some of the example MCI and MSL processing schemes disclosed herein are based at least in part on a biaxial anisotropy (BA), (otherwise known as orthorhombic anisotropy), model. FIG. 4 is a schematic diagram of formation models, in accordance with one or more example embodiments. The diagram includes two panels, labeled A and B respectively.

Panel A shows a three-dimensional (3D) view of a transversely isotropic (TI) model. The TI model can account for resistivity differences between, on the one hand, orthogonal axes lying in a formation or bedding plane (sometimes referred to as the horizontal or transverse plane), and, on the other hand, an axis perpendicular to the formation or bedding plane (sometimes referred to as the vertical axis). The TI model thus can account for anisotropy between the "vertical" axis and the "horizontal" plane, but assumes isotropy between different axes in the "horizontal" or transverse plane. For this reason, the TI model is also referred to being TI anisotropic. However, many geological formations contain different types of natural and/or non-natural fractures that often display resistivity biaxial anisotropy (BA). If a transversely isotropic formation is affected by fractures, it can be represented by a biaxial anisotropic model.

Panel B shows a three-dimensional view of a biaxial anisotropic model. If a formation contains fractures that cut across the formation bedding plane, such as illustrated in Panel B, the conductivity/resistivity will no longer be of TI anisotropy but of BA anisotropy in the macroscopic petrophysical properties. Several different geological factors (e.g., fractures, cross-bedding, and varied depositional conditions in the bedding plane) can give rise to formation BA anisotropy, the most common being fractures that vertically cut across the formations. Hydrocarbon reservoirs are, for example, often located in formations which are identified by borehole resistivity tools as having resistivity/conductivity anisotropy. Examples include thinly laminated sand-shale or fractured bedded sand-sand/shale rock sequences.

The BA model additionally accounts for anisotropy between orthogonal axes in the transverse plane, and is therefore also referred to as accounting for triaxial anisotropy. Note that, unless otherwise specified, "biaxial anisotropy" and its derivations refer to transverse biaxial anisotropy. Consistent with this terminology, a TI model does not account for biaxial anisotropy, even though it accounts for anisotropy between two axes (e.g., between the horizontal plane and the vertical axis).

We describe formation resistivity/conductivity of BA anisotropy in the formation's principal coordinate system. This system is chosen so that the x- or y-axis direction coincides with a conductivity tensor's principal axis having the largest conductivity (or smallest resistivity) component in the bedding plane; the z axis is parallel to the conductivity principal axis having the smallest conductivity component. In this principal axis coordinate system, the formation conductivity can be expressed as a diagonal tensor:

$$\overline{\sigma}_f = \text{diag}(C_x, C_y, C_z). \tag{1}$$

where $\overline{\sigma}$ is the formation conductivity tensor, its elements $C_x$ and $C_y$ are the two conductivities in the two principal-axis (e.g., x- and y-axes) in the bedding plane, and $C_z$ is the conductivity in the principal-axis direction perpendicular to the bedding plane.

If equation (1) is expressed in resistivity terms, the formation resistivity can be expressed as the following diagonal tensor:

$$\overline{R}_t = \text{diag}(R_x, R_y, R_z), \tag{2}$$

where $\overline{R}_t$ is the formation resistivity tensors, and its elements $R_x$, $R_y$, and $R_z$ are the triaxial resistivity components in the three principal-axis directions (xf, yf, and zf), respectively. It is noted that in a TI formation without fractures, resistivity can be represented as a diagonal tensor that is only described using two resistivity components: $R_h$ (wherein $R_h = R_x = R_y$) and $R_v$ (wherein $R_v = R_z$) in the principal axis system (e.g., x-y-z coordinate system), however, the resistivity tensor of the BA model is best described using the triaxial resistivity components: $R_x$, $R_y$, and $R_z$.

Based on equations (1) and (2), one can derive the relations among resistivity and conductivity components $R_x = 1/C_x$, $R_y = 1/C_y$, and $R_z = 1/C_z$. If $R_x = R_y = R_z$, then the formation resistivity is isotropic. If only $R_x = R_y \neq R_z$, then the formation resistivity is transversely isotropic; therefore, only one resistivity component is necessary in the bedding plane. In this case, both $R_x$ and $R_y$ are usually called horizontal resistivity and are often denoted as $R_h$ ($= R_x = R_y$); and, $R_z$ is called the vertical resistivity and is usually denoted as $R_v$. If $R_x \neq R_y \neq R_z$, the formation resistivity is of BA anisotropy. It is can be seen that the isotropy and transverse isotropy are only two special cases of the biaxial anisotropy. For the practical applications, different ratio notations are used. For example, ratios $R_{xy} = R_x/R_y$, or $R_{zx} = R_z/R_x$ and $R_{zy} = R_z/R_y$.

Resistivity and Sonic Fracture Indicators

As discussed herein, the following resistivity and sonic fracture indicators, $x_1$ through $x_8$, can be determined in various identification functions for combining into a final identification function $F_{ID}$, described further below, and can be used in determining the presence of fractures in subsurface formations.

Azimuthal Anisotropy ($x_1$)—Azimuthal anisotropy of horizontal resistivity in a formation bedding plane can be represented using the following equation:

$$x_1 = \frac{2|R_x - R_y|}{R_x + R_y} = \frac{2|R_{xy} - 1|}{R_{xy} + 1}. \tag{3}$$

where $x_1$ represents azimuthal anisotropy. $x_1$ is close to 0 if $R_{xy} = R_x/R_y$ is close to 1. $x_1$ is close to 2 if $R_{xy}$ is significantly greater than 1 or if it is close to zero, and therefore $0 \leq f_1(x_1) \leq 2$.

If the ratios $R_{xy}$ or $R_{yx}$ ($= R_y/R_x$) are used as $x_1$, then the following two-piece wise function is used to represent $f_1(x_1)$ $$f_1(x_1) = \min(R_{xy}, R_{yx}), \text{ or}$$

$$f_1(x_1) = \begin{cases} Rxy, & \text{if } Rxy \leq 1 \\ Ryx, & \text{if } Ryx \leq 1 \end{cases}, \tag{4}$$

where $0 \leq f_1(x_1) \leq 1$, and min denotes a minimum function.

Indication function $f_1(x_1)$ is a function of variable $x_1$. If $f_1(x_1^{(min)}) = 0$, and $f_1(x_1^{(max)}) = 1$, then $x_1^{(min)} \leq x_1 \leq x_1^{(max)}$, $x_1^{(min)}$ and $x_1^{(max)}$ represent the minimum and maximum values of variable $x_1$. For example, function $f_1(x_1)$ can be expressed as $f_1(x_1) = x_1/2$ or $f_1(x_1) = \frac{1}{2}[1 - \tan h(x_1)]$. Here, tan h(x) is a hyperbolic tangent function. Function $f_1(x_1)$ is used as the identification function for determining the possibility of the fracture existence by using inverted $R_x$ and $R_y$ parameters from BA-model based processing.

With multi-frequency MCI logging data, $R_x$ and $R_y$ can be obtained by using multi-frequency data inversion. With multi-frequency inversions, the inverted resistivities will have different accuracies with different frequencies. The following optimization equations can be used to obtain $R_x$ and $R_y$:

$$R_x = \text{opt}(R_x^{(1)}, R_x^{(2)}, \ldots, R_x^{(Mf)}) \quad (5)$$

$$R_y = \text{opt}(R_y^{(1)}, R_y^{(2)}, \ldots, R_y^{(Mf)}) \quad (6)$$

where $R_x^{(1)}, R_x^{(2)}, \ldots, R_x^{(Mf)}$ are the inverted $R_x$ parameters from the multi-frequency data inversion, Mf is the total number of the tool frequencies, and $R_y^{(1)}, R_y^{(2)}, \ldots, R_y^{(Mf)}$ are the inverted $R_y$ parameters from the multi-frequency data inversion. In some embodiments, the optimization equations (5) and (6) can use the weighted average function for different frequency inverted logs.

XX/YY Component Splitting ($x_2$)—If the XX and YY responses of triaxial arrays are used, XX and YY component splitting can be represented using the following equation:

$$x_2 = \frac{2|XX - YY|}{|XX| + |YY| + \varepsilon_{xy}} \quad (7)$$

Alternatively, $x_2$ can also represented as a difference between the two components (e.g., $x_2 = XX-YY$). If $f_2(x_2^{(min)})=0$, $f_2(x_2^{(max)})=1$, then $x_2^{(min)} \leq x_2 \leq x_2^{(max)}$, $x_2^{(min)}$ and $x_2^{(max)}$ represent the minimum and maximum values of $x_2$. $\varepsilon_{xy}$ is a small constant greater than zero that is provided for the purpose of preventing the denominator from being zero.

Function $f_2(x_2)$ is used as an identification function for the possibility of the fracture existence by using XX and YY log responses at an azimuth=0°. If $f_2(x_2)=0$, the probably of fracture existence is zero (e.g, no fracture is present). If $f_2(x_2)=1$, the probability of fracture existence is 1 (e.g., a fracture is definitely present). Alternatively, the identification function $f_2(x_2)$ can also be expressed as $f_2(x_2)=x_2$ or $f_2(x_2)=\frac{1}{2}[1+\tan h(x_2)]$.

The XX and YY components are affected differently by borehole conditions (e.g., borehole size, mud, and tool eccentricity). Thus, borehole corrected XX and YY responses can be used for the computation of variable $x_2$. Further, $x_2$ is represents the normalized difference (relative to XX-YY) of the XX and YY responses.

Figure 5:
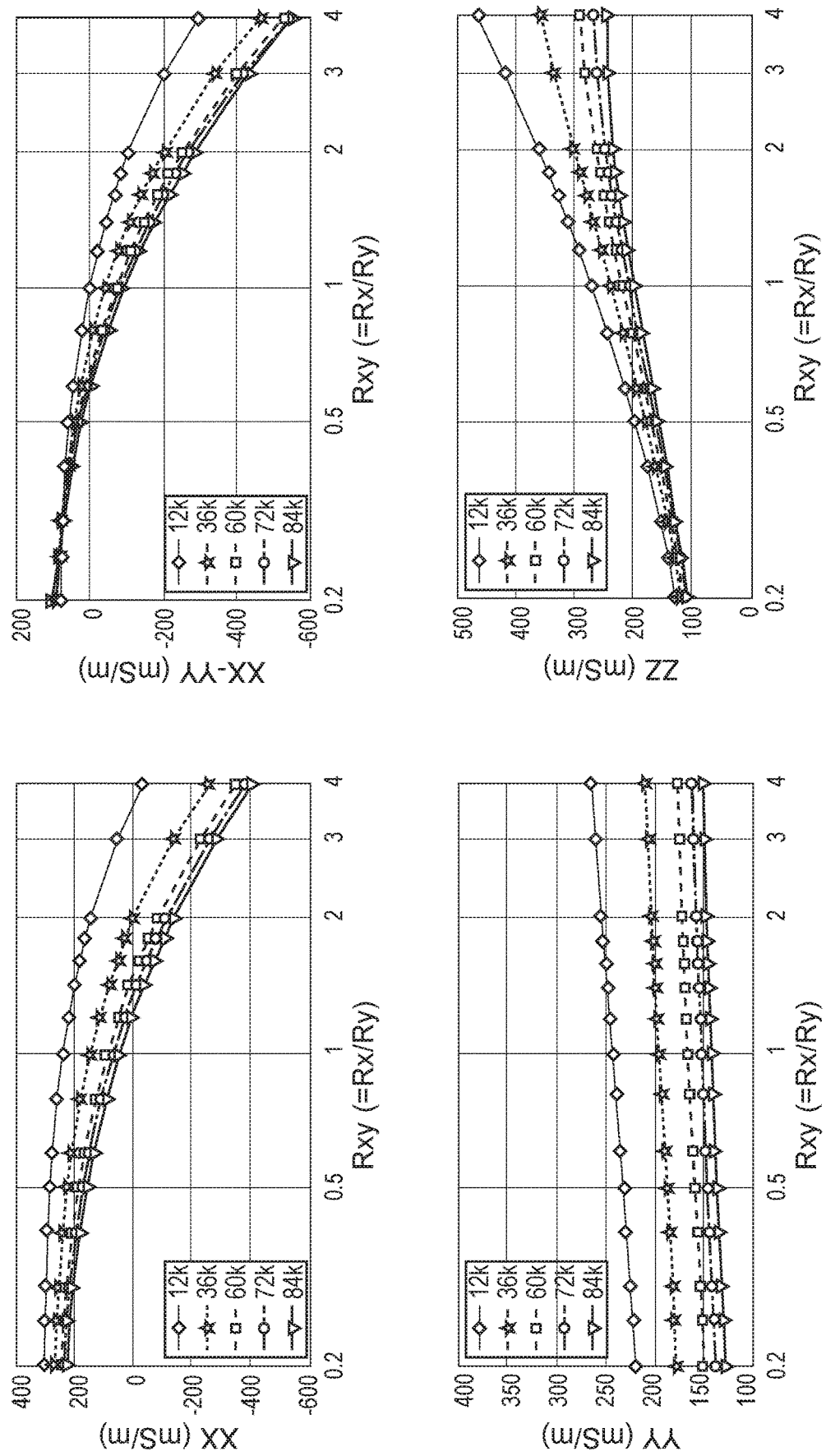
FIG. 5 is a set of graphs showing example MCI measurement values (XX, XZ, YY, and ZZ) at various frequencies versus horizontal resistivity ratio $R_{xy}$ ($=R_x/R_y$), according to one or more example embodiments.

Similar to the inverted resistivities previously described, the XX and YY components are also functions of the tool frequency. Therefore, different frequencies have different contribution to the XX/YY component splitting. For example, FIG. 5 illustrates a set of graphs showing example MCI measurement values (XX, XZ, YY, and ZZ) at various frequencies versus horizontal resistivity ratio $R_{xy}$ (=$R_x/R_y$), according to one or more example embodiments. As illustrated, a triaxial array is simulated as operating at five different frequencies (e.g., 12, 36, 60, 72, and 84 KHz). In these graphs, the x-axis is the ratio $R_{xy}$ and the y-axis is a simulated MCI component. In this example, the x-directed resistivity $R_x=2$ ohm-m, the z-directed resistivity $R_z=10$ ohm-m, and the formation dip=60°.

In FIG. 5, the simulated responses of MCI components for the different operating frequencies are illustrated, with the differences among them primarily caused by skin effects. With induction logging, the higher the operating frequency, the stronger the frequency effect is on measurements due to stronger skin effects. Therefore, for XX-YY, lower frequency data should be used to minimize frequency effects. In addition, the short-spacing logging data should be used for the frequency-effect reduction. The XX/YY component splitting is also affected by formation dip, and therefore, dip-effect corrections should be applied to the XX and YY components before they are used for calculation of variable $x_2$.

Formation-Dip Splitting ($x_3$)—formation-dip splitting from TI- and BA-model based inversions can be represented using the following equation:

$$x_3 = \frac{2|dip^{(TI)} - dip^{(BA)}|}{[dip^{(TI)} + dip^{(BA)}] + \varepsilon_{dip}}, \quad (8)$$

Alternatively, $x_3$ can also be represented as a difference between the two dip parameters (e.g., $x_3 = dip^{(TI)} - dip^{(BA)}$). $x_3^{(min)} \leq x_3 \leq x_3^{(max)}$, $x_3^{(min)}$ and $x_3^{(max)}$ represent the minimum and maximum values of the variable $x_3$. $dip^{(TI)}$ and $dip^{(BA)}$ are the recovered formation dips from TI- and BA-model based processings, respectively. $\varepsilon_{dip}$ is a small constant greater than zero for the purpose of preventing both $dip^{(TI)}$ and $dip^{(BA)}$ being zero.

Function $f_3(x_3)$ is used as the identification function for determining the probability of fracture existence, wherein $f_3(x_3^{(min)})=0$ and $f_3(x_3^{(max)})=1$. Alternatively, the identification function $f_3(x_3)$ can also be expressed as either $f_3(x_3)=x_3$ or $f_3(x_3)=\frac{1}{2}[1+\tan h(x_3)]$.

Similar to inverted resistivities, the following optimization equations can be used to obtain two optimal dip angles for determining $x_3$:

$$dip^{(TI)} = \text{opt}(dip_{TI}^{(1)}, dip_{TI}^{(2)}, \ldots, dip_{TI}^{(Mf)}) \quad (9)$$

$$dip^{(BA)} = \text{opt}(dip_{BA}^{(1)}, dip_{BA}^{(2)}, \ldots, dip_{BA}^{(Mf)}) \quad (10)$$

Conventional Resistivity Log Separation ($x_4$)—The resistivity log separation can be represented using the following equation:

$$x_4 = \frac{\Delta}{R_i}. \quad (11)$$

In equation (11), $\Delta = \max(\Sigma_{i=1}^{5}\Sigma_{j=1}^{5}|R_i-R_j|)$ and $R_i = \frac{1}{5}\Sigma_i^5 R_i$, $R_t = \max(R10, R20, R30, R60, R90)$. $x_4^{(min)} \leq x_4 \leq x_4^{(max)}$, $x_4^{(min)}$ and $x_4^{(max)}$ represent the minimum and maximum values of $x_4$.

The identification function $f_4(x_4)$ is used for determining the probability of fracture existence by using the separation between the conventional logs R90 and R10 at a given vertical resolution, wherein $f_4(x_4^{(min)})=0$, and $f_4(x_4^{(max)})=1$. Alternatively, identification function $f_4(x_4)$ can also be expressed as either $f_4(x_4)=x_4$ or $f_4(x_4)=\frac{1}{2}[1+\tan h(x_4)]$. Generally, there are no obvious separations among conventional resistivity logs in oil-based mud (OBM) wells or in shale-formation zones. Therefore, if separations are present in log data can be attributable to the presence of fractures.

Azimuthal Anisotropy of Shear-Wave Velocity ($x_5$)—the azimuthal anisotropy of shear-wave velocity (or slowness) can be represented using the following equation:

$$SV^{anis}(z) = \frac{2(V_{FS}(z) - V_{SS}(z))}{(V_{FS}(z) + V_{SS}(z))/2}. \tag{12}$$

In equation (12), $SV^{anis}(z)$ is a normalized shear velocity difference and is a dimensionless quantity. $V_{FS}$ and $V_{SS}$ are the fast and slow shear-wave velocities, respectively, and z represents logging depth. Alternatively, equation (13) provided below can be used to calculate azimuthal anisotropy:

$$SV^{anis}(z) = \sum_i \frac{V_{FS}(z) - V_{SS}(z)}{(V_{FS}(z) + V_{SS}(z))/2} \tag{13}$$

wherein, $SV^{an}(z)$ is an averaged azimuthal anisotropy in a selected logging-depth window.

Natural and induced fractures are able to produce the azimuthal shear velocity anisotropy around the borehole, with shear waves that are polarized in different azimuthal directions propagating at different velocities. It is noted that azimuthal anisotropy can also have other causes, including, but not limited to: (i) faults, (ii) unbalanced formation stresses, (iii) dipping beds, (iv) overburden stress due to a highly deviated well, (v) bad-hole conditions such as washouts, rugosity, and (vi) ovality. Therefore, this cross-dipole-measured anisotropy should be used in addition to information from other logging data to resolve the cause of anisotropy.

Difference of ST-Wave Reflectance ($x_6$)

When a borehole Stoneley (ST) wave encounters a permeable fracture crossing the borehole, the wave is partly reflected from the fracture, due to the wave-induced hydraulic interaction between borehole and fracture. Numerical simulations and field data show that the ST-wave reflectance curves between low frequency (e.g., 0-1 kHz) and high frequency (e.g., 1-2 kHz) ranges in permeable fracture sections are significantly different. However, the low- and high-frequency ST-wave reflectance values are almost the same in sections of healed or closed fractures, non-permeable bed boundaries, and borehole changes. Thus, the difference (or separation) of ST-wave reflectance over low and high frequency ranges can be used to detect permeable fractures crossing boreholes, based on the frequency-dependence of fracture-induced Stoneley reflections.

It is noted that the frequency-dependence of ST-wave reflectance is not a unique diagnostic of permeable fractures. Other factors, such as permeable bed boundaries, can also cause this difference. Therefore, this reflectance information should be used in addition to information from other logging measurement results for reducing the uncertainty of the diagnosis.

The difference between two ST-wave reflectances over low and high frequency ranges can be represented using the following equation:

$$(z) = (z) - k_{hf}(z) \tag{14}$$

wherein $k(z)$ and $k_{hf}(z)$ are the low and high-frequency ST-wave reflectances.

ST-Wave Attenuation ($x_7$)—The ST-wave attenuation can also be referred to as ST-derived formation permeability, and can be represented using the following equation:

$$(z) = 1 - (z). \tag{15}$$

$$\text{wherein } ST_{eng}(z) = \frac{E_{ST}(z) - E_{STmin}}{E_{STmax} - E_{STmin}},$$

$$E_{ST}(z) = \int_{f1}^{f2} |ST(z, f)^2| df,$$

$$\text{and } ST(z, f) = \int_{-\infty}^{\infty} ST(z, t)e^{-i\omega t} dt.$$

The ST-wave is a guided wave borne in the borehole fluid. It is sensitive to fluid density and modulus, formation density and moduli, and especially formation permeability. Because natural induced fractures may significantly increase the formation permeability near the wellbore, the ST-wave is expected to experience higher attenuation in fractured zones than in unfractured zones. Hence, fractured zones frequently show high ST-wave attenuation or ST-derived formation permeability.

The ST-wave is a guided wave borne in the borehole fluid. The ST-wave is sensitive to fluid density and modulus, formation density and moduli (and especially, formation permeability). Because natural induced fractures may significantly increase the formation permeability near the wellbore, the ST wave is expected to experience higher attenuation in fractured zones than in un-fractured zones. Therefore, fractured zones frequently show high ST-wave attenuation or ST-derived formation permeability. For example, a high ST-wave attenuation or ST-derived permeability in shale formations is usually a strong indication of the existence of fractures. However, a number of other factors can also affect the amplitude of the ST-wave log measurement (e.g., formation elasticity, intrinsic attenuation, borehole size, mud cake and anisotropy, and the derivation of formation permeability).

Two Fracture Strike Difference ($x_8$)—Fracture strikes from both MCI and cross-dipole data processing can be compared for determining the presence of formation fractures. If data regarding fracture strikes from both data processings match, it is a good indication for the presence of formation fractures.

Although described here in the context of having eight different fracture indicators from MCI and MSL logs, it should be appreciated that variables from other sensor logs can be also defined, without departing from the scope of this disclosure. For example, additional identification functions can be defined using borehole imaging data.

According to the above discussion about the different identification functions, the fracture indicators (e.g., $x_1$ through $x_8$) can be combined and defined for a selected depth window with M log points. The final, combined $F_{ID}$ function can be represented using the following equation:

$$F_{ID}(\overline{X}_j, z_j) = \sum_{k=1}^{9} w_k \cdot \frac{1}{M} \sum_{j=1}^{M} f_k^j(x_k^j, z_j) \tag{16}$$

wherein $\overline{X}_j = (x_1, x_2, \ldots, x_9)^T$ and $w_k$ are the weight coefficients for different identification functions $f_k^j(x_k^j, z_j)$ at depth $z_j$. M is the total point number of the depth window and $$\sum_{k=1}^{9} w_k = 1, 0 \leq w_k \leq 1.$$

The various weight coefficients can in some embodiments differ from one another in order to give greater weight to some components of the $F_{ID}$ function. These weightings may differ between different embodiments, for example based on user preferences or on the characteristics of particular formations or particular measurement systems. In some embodiments, for example, higher weighting values may be given to ID function components that are based on higher-quality data, such as $x_1$ based on Rx and Ry.

In some embodiments, only some of the ID function components are used for fracture identification. This may, for example, depend on parameter availability and/or user preferences. For example, if only the variable $x_1$ is used to define the final $F_{ID}$, then $w_1=1$, all other weights are 0 (e.g., $w_2=w_3=w_4=w_5=0$), and $F_{ID}(\overline{X})=f_1(x_1)$ at M=1. If only the variable $x_2$ is used to define the final $F_{ID}$, then $$F_{ID}(\overline{X}) = \frac{2|XX-YY|}{|XX|+|YY|+\varepsilon_{xy}}.$$

It can be seen that the ID function $F_{ID}(\overline{X})$ satisfies inequity equation: $0 \leq F_{ID}(\overline{X}) \leq 1$. Once all necessary cut-off values or threshold values for different variables are determined, the $F_{ID}$ function $F_{ID}(\overline{X})$ may be used to determine if fractures exists near the wellbore.

Alternatively, the final $F_{ID}$ for M=1 can be represented using one of the following equations:

$$F_{ID}(\overline{X}) = \min[f_1(x_1), f_2(x_2), \ldots, f_9(x_9)] \quad (17)$$

$$F_{ID}(\overline{X}) = \left(\prod_{k=1}^{9} f_k(x_k)\right)^{\frac{1}{9}} \quad (18)$$

The final $F_{ID}$ function (e.g., representative using any of equations (16)-(18)) can be processed using a lithology-effect reduction function and/or a bed-boundary effect reduction to minimize their respective effects on the final $F_{ID}$ function. For example, cross bedding can also cause azimuthal anisotropy of horizontal resistivity. Cross bedding is more likely to occur in sandstones, with fractures usually developed in a shale formation. The lithology-effect reduction function can represented using the following equation:

$$f_{le}(z, V_{sh}) = \tan h(a^* V_{sh}) \quad (19)$$

wherein $f_{le}(z, V_{sh})$ is the lithology-effect reduction function, $V_{sh}$ is the shale volume of the formation (expressed in unit of percentages), and a is a constant. For example, we can use gamma ray logs to estimate $V_{sh}$.

The data employed in these identification functions may comprise both wireline and LWD data, acoustic logs, imager data, formation testers, and more for combined analysis to reduce the risk of incorrect fracture evaluation. Cutoff values or threshold values for the identification functions may be custom selected by an operator, or can be established with reference to known fracture occurrences. Such thresholds values can thereafter be used for fracture identification. For example, calculated or inverted formation parameters that result in an above-threshold value for an identification function can automatically be interpreted as indicating presence of a fracture. Conversely, it can be estimated that no fracture is present in a formation if the value of the identification function calculated based on MCI/MSL measurement data captured in the formation is lower than the threshold value. For example, if the threshold value is determined or selected to be 0.25, an identification value of 0.3 is interpreted as indicating fracture presence, while identification value of 0.2 is interpreted as indicating the absence of a fracture in the formation. These operations may, for example, being performed in automated fashion by the fracture identification module 1008 of FIG. 10.

Further, while calculation of the final $F_{ID}$ function value can in one or more embodiments be based on all eight indicators (e.g., $x_1 \ldots x_8$) of the identification functions as described above, a subset of these indicators may in one or more embodiments be used in calculating the final $F_{ID}$ function value. Selection of the particular indicators of the $F_{ID}$ function which is to be used in a particular instance may be based on whether or not the respective parameters of the different indicators are available, which may in some instances depend on which inversion schemes have been executed.

Figure 6:
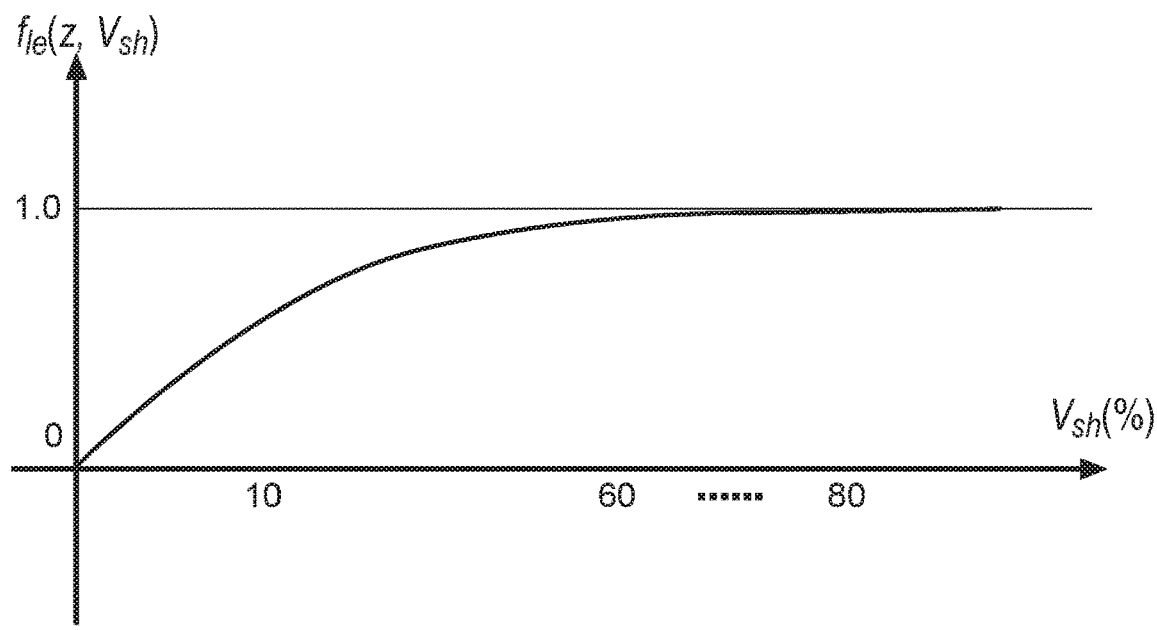
FIG. 6 is a schematic diagram of a lithology-effect reduction function, according to one or more example embodiments.

FIG. 6 is a schematic diagram of a lithology-effect reduction function, according to one or more example embodiments. The x-axis represents the shale volume of the formation. In some embodiments, the shale volume can be determined using methods such as Gamma ray (GR), SP, neutron-density, resistivity, and spectral GR logs. As illustrated, in the clean sand section of a shale-sand lamination formation, $(z, _h)$ is close to zero (e.g., $V_{sh}=0$). However, in a pure shale section with $V_{sh}$ close to 100%, $(z, _h)$ is close to 1.

The bed-boundary effect reduction function can represented using the following equation:

$$f_{bbe}(z) = 1 - \Sigma_{k=1}^{M_b}[H(z-z_k+\Delta)-H(z-z_k-\Delta)] \quad (20)$$

wherein $f_b(z)$ is the bed-boundary effect reduction function, $M_b$ is the total number of formation beds in a log profile, and $H(z-z_k+\Delta)$ and $H(z-z_k-\Delta)$ are the two boxcar functions. In equation (20), $\Delta$ is a shift constant around depth $z_k$. For example, we can use MCI logs to detect the bed-boundary $z_k$.

Figure 7:
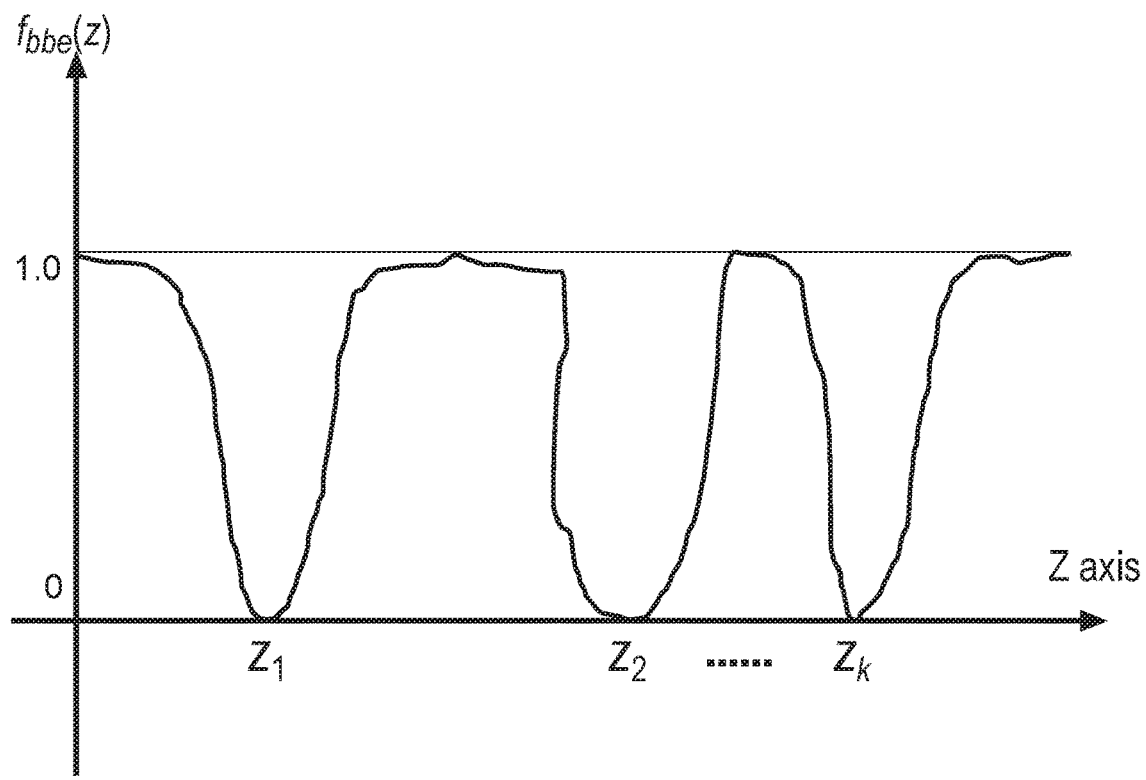
FIG. 7 is a schematic diagram of a bed-boundary effect reduction function, according to one or more example embodiments.

FIG. 7 is a schematic diagram of a bed-boundary effect reduction function, according to one or more example embodiments. As illustrated, $f_{bbe}(z)$ is close to zero when depth z is in the range $z_k - \Delta \leq z \leq z_k + \Delta$.

In some embodiments, the final $F_{ID}$ function can include both the lithology-effect reduction function (e.g., equation (19)) and bed-boundary effect reduction function (e.g., equation (20)), and is represented using the following equation:

$$F'_{ID}(z) = F_{le}(z, V_{sh}) \cdot f_{bbe}(z) \cdot F_{ID}(z) \quad (21)$$

Determination of Fracture Strike Angle

If a fracture is detected near or around a borehole, both the sonic and MCI logging data can be used to estimate the fracture strike/azimuth. For example, in a four-component (4C) cross-dipole logging measurement, the 4C waveforms can be rotated to any angle, $\varphi$, and is represented using the following tensor rotation equation:

$$\begin{pmatrix} XX' & XY' \\ YX' & YY' \end{pmatrix} = \begin{pmatrix} \cos(\varphi) & \sin(\varphi) \\ -\sin(\varphi) & \cos(\varphi) \end{pmatrix} \cdot \begin{pmatrix} XX & XY \\ YX & YY \end{pmatrix} \cdot \begin{pmatrix} \cos(\varphi) & -\sin(\varphi) \\ \sin(\varphi) & \cos(\varphi) \end{pmatrix} \quad (22)$$

In some embodiments, the following minimization equation can be solved by using only sonic logging data for determination of fracture strike/azimuth:

$$\min_\varphi \int [|XY(t,\varphi)|+|YX(t,\varphi)|]dt \quad (23)$$

wherein the angle, $\varphi$, corresponding to the minimization is the fracture strike.

In another example, MCI tools acquire nine-component (9C) apparent conductivity tensor measurements, and can be represented using the following tensor rotation equation for the 9C conductivity tensors:

$$\begin{pmatrix} \sigma'_{xx} & \sigma'_{xy} & \sigma'_{xz} \\ \sigma'_{yx} & \sigma'_{yy} & \sigma'_{yz} \\ \sigma'_{zx} & \sigma'_{zy} & \sigma'_{zz} \end{pmatrix} = \quad (24)$$

$$\begin{pmatrix} \cos(\varphi) & \sin(\varphi) & 0 \\ -\sin(\varphi) & \cos(\varphi) & 0 \\ 0 & 0 & 1 \end{pmatrix} \cdot \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix} \cdot \begin{pmatrix} \cos(\varphi) & -\sin(\varphi) & 0 \\ \sin(\varphi) & \cos(\varphi) & 0 \\ 0 & 0 & 1 \end{pmatrix}$$

The following minimization equation can be solved by using only MCI 9C data for determination of fracture strike angle:

$$\min_\varphi (|\sigma_{xy}'(\varphi)+\sigma_{yx}'(\varphi)|+|\sigma_{yz}'(\varphi)+\sigma_{zy}'(\varphi)|) \quad (25)$$

In some embodiments, the fracture strike angle can be determined using both sonic and MCI data with the following equation:

$$\min_\varphi \{\int [|XY(t,\varphi)|+|YX(t,\varphi)|]dt + [|\sigma_{xy}'(\varphi)+\sigma_{yx}'(\varphi)|+ |\sigma_{yz}'(\varphi)+\sigma_{zy}'(\varphi)|]\} \quad (26)$$

The joint sonic and MCI data processing of equation (26) for determining fracture strike angle reduces measurement noise on the calculated strike angle, relative to the individual processing either equation (24) or (25).

Determination of Fracture Length and Width

Figure 8:
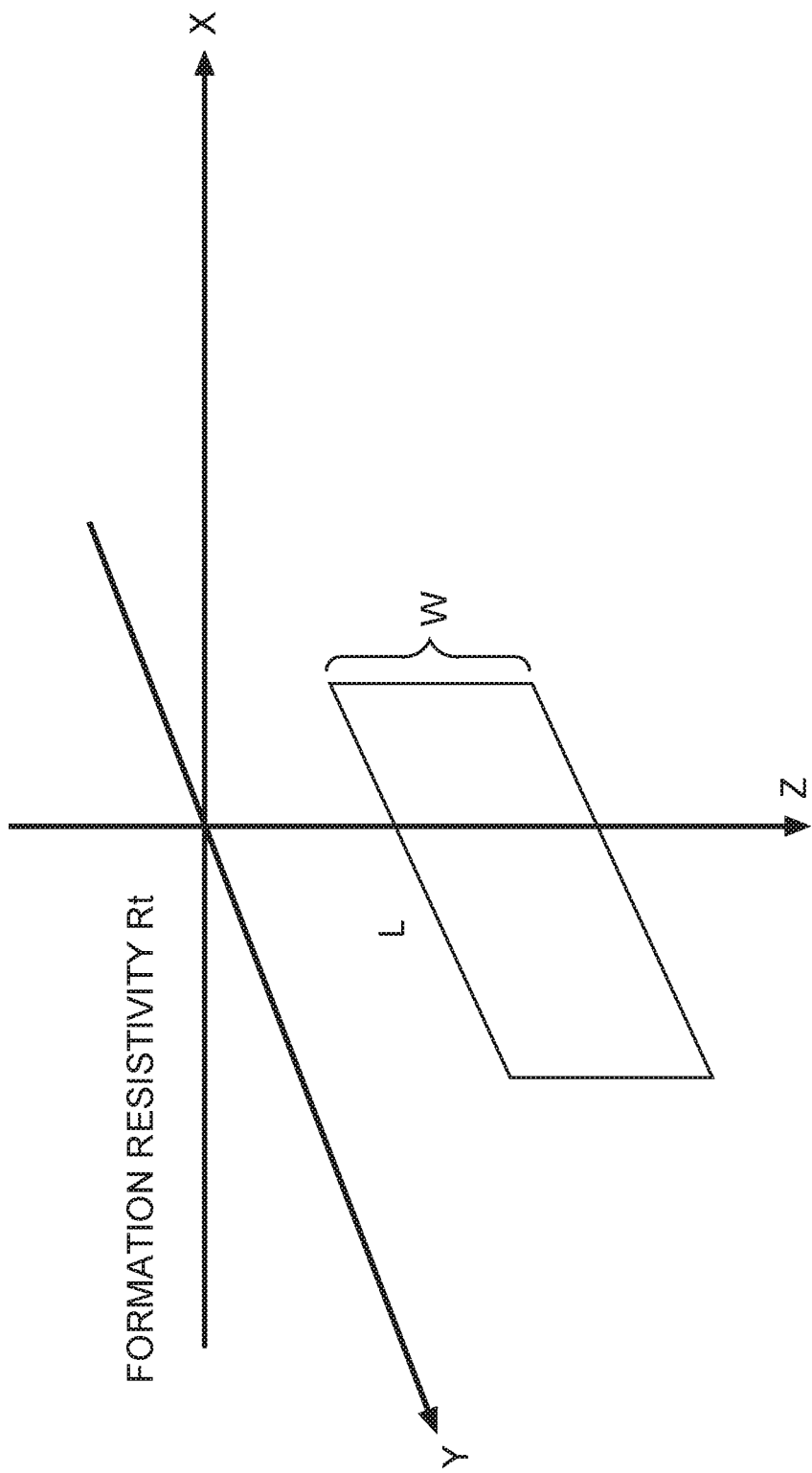
FIG. 8 is a schematic diagram of a fracture-formation model, according to one or more example embodiments.

FIG. 8 is a schematic diagram of a fracture-formation model 800, according to one or more example embodiments. The fracture-formation model consists of a homogeneous unbounded formation, referred to as a zero-D model (0D), for modeling a formation with $R_t$ resistivity. Fractures in the formation the parameters of $R_f$ resistivity, length (L), and width (W).

Based on MCI measurements and simulated responses based on fracture-formation model 800, then following optimization equation can be used for obtaining fracture length and width:

$$\text{Min } obj = \sum_{i=1}^{N} (D_i - d_i^m)^2 \quad (27)$$

where $D_i$ represents a single MCI measurement (e.g., XX, or YY, . . . ) in an anisotropy-corrected log having i=1, 2, . . . , N. The parameter $d_i^m = f(R_t, L, W, R_f)$ and represents the simulated MCI response. Various optimization algorithms can be used to solve this minimization issue. The numerical simulation of $d_i^m = f(R_t, L, W, R_f)$ can be timing consuming, and therefore, the values can be pre-calculated and saved as a lookup table (or in a data library) to be used as a forward engine in the data inversion.

Fracture Interpretation Workflow

Figure 9:
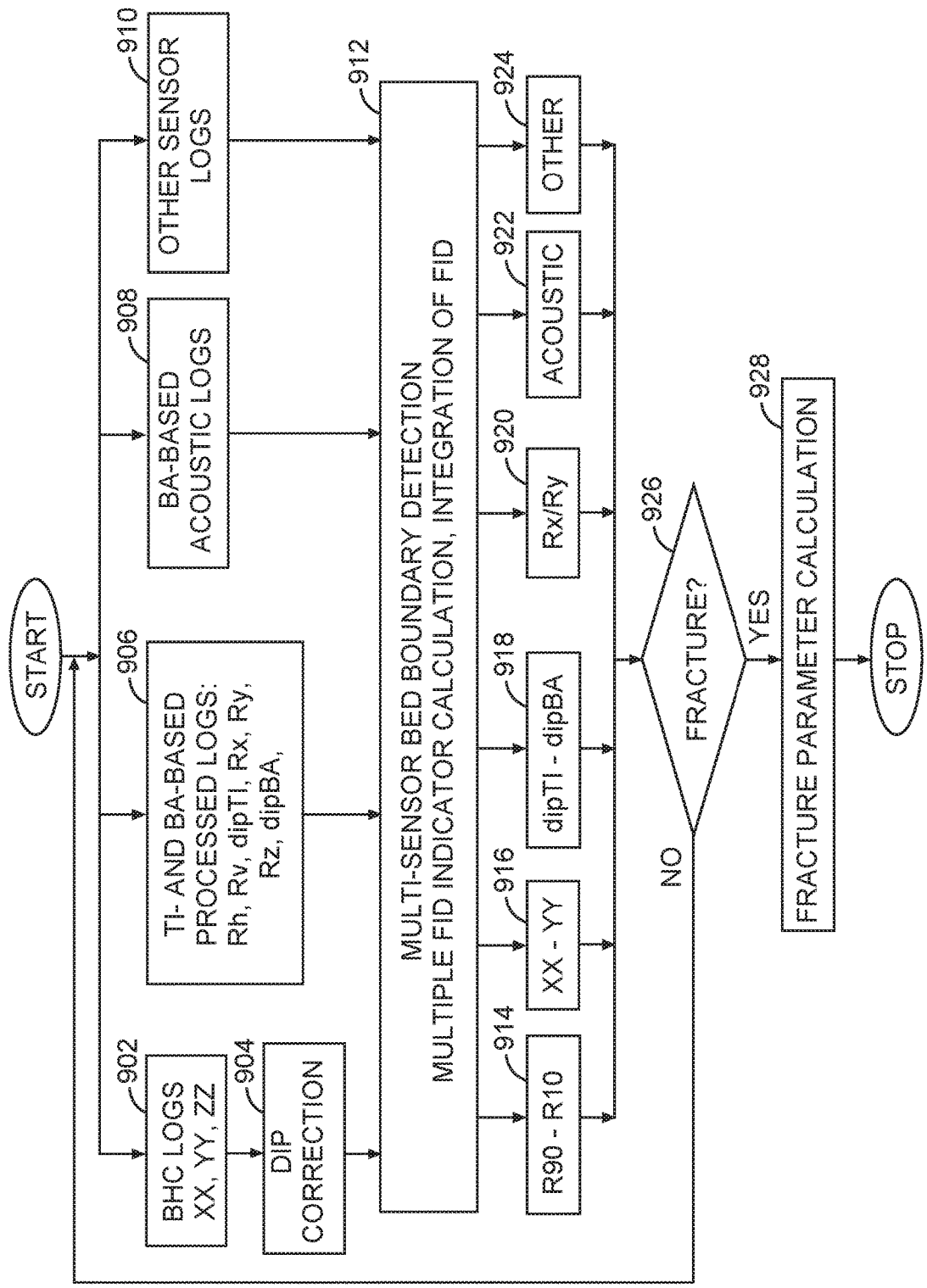
FIG. 9 is a flow chart illustrating a method for fracture interpretation, according to one or more example embodiments.

FIG. 9 is a flow chart illustrating a method 900 comprising multi-level data processing based on multiple forward models with BA and TI anisotropies. The method 900 provides for fracture evaluation (e.g., identification and quantification) using an integration of MCI and MSL logging data.

At operation 902, MCI measurement data captured by a triaxial MCI tool in a borehole extending through a subsurface geological formations is inputted after calibration, temperature correction and other preprocessing. This preprocessing does not include skin-effect correction. The MCI data may be multi-frequency data, and may be taken at multiple spacings. In some embodiments, the MCI measurement data can be single-frequency measurements for the respective arrays of the tool. The MCI data is processed based on a borehole-correction (BHC) model to generate BHC-corrected logs having MCI borehole corrected measurement data.

At operation 904, dip correction is applied to the BHC corrected logs. The borehole typically intersects formation beds at an angle other than the ideal ninety degrees. Consequently, formation boundaries intersect the borehole at an angle, making the transition between formation layers appear more gradual than is actually the case. Dip correction uses formation dip angle measurements to compensate for dip angle effects on the MCI measurement data. There are often two types of dip effects. The first dip effect, which is referred to as "type I relative dip effect," is associated with a sampling mismatch (e.g., mismatch in the distance between samples) in the standard processing caused by dip. Type 1 relative dip effect occurs due to an assumption by the standard array induction processing of a vertical borehole with True Vertical Depth (TVD) step size. However, the relative dip angle effects the ND utilized during processing, wherein the TVD distance between two adjacent measurement points is step size multiplied by $\cos(\theta)$. As one example, this would be $0.25*\cos(\theta)$, where $\theta$ is relative dip angle and 0.25 feet is the measured depth step size. Therefore, for $\theta=75°$, the TVD distance between two adjacent measurement points in the example becomes 0.0647 ft. Thus, type I relative dip effect is more an algorithm error than a physical effect. This type of dip effect can be corrected by using interpolation to generate a sequence of data points separated by an adjusted TVD.

The second type of dip effect, which is referred to as "type II relative dip effect," is the physical dip effect caused by increased shoulder effect and bed boundary effects associated with dip. To remove type II relative dip effect, an algorithm based on numerical inversion is utilized. The algorithm uses borehole corrected and skin effect corrected data in a scheme that relies on a 1D fast analytic forward modeling using a vertical one-dimensional (V1D) model for simulating layered formations without hole and invasion. Once the layers of the V1D inversion are found, the type II relative dip effect is evaluated synthetically and removed from induction logs. Techniques embodying the dip correction of operation 904 can also be found in published application: WO2015/102640A1.

At operation 906, inversion processing is applied to MCI measurement data to produced inverted parameters to be used for fracture interpretation. For example, a TI-based inversion can be applied to produce the inverted TI parameters of $dip^{(TI)}$, $R_h$, and $R_v$. Further, a BA-based inversion can be applied to produce the inverted BA parameters of $dip^{(BA)}$, $R_x$, $R_y$, and $R_z$. Each of these TI- and BA-based inversion processings can be based on various formation models, including, but not limited to: radially one-dimensional (R1D) and zero-dimensional (0D) models.

At operation 908, sonic logging data is inputted for processing. Acoustic data can be acquired using conventional borehole-compensated monopole devices, monopole and multiple array devices, and various LWD acoustic logging tools. Such acoustic data can include, but is not limited to: azimuth anisotropic log, Stoneley attenuations, and Stoneley-wave reflectance over low and high frequency ranges. Data from other sensor logs can also be inputted at operation 910, such as borehole imaging data.

At operation 912, the various MCI and MSL data from the previous operations are input for bed boundary detection processing, which may include lithology-effect and bed-boundary-effect reductions as previously discussed relative to equations (19)-(20). Operations 912-924 further comprises calculating of the various fracture indicators (e.g., $x_1 \ldots x_8$ as previously described) and integration of the indicators into the $F_{ID}$ function.

Operation 926 comprises performance of fracture interpretation (e.g., detection and identification) from the raw data and processed logs based on the relevant different forward models (TI and BA models) and the fracture identification function ($F_{ID}$). If a fracture is indicated as being present, fracture parameter calculations (e.g., quantification) can be performed at operation 928 using, for example, equations (22) through (27) as discussed above.

Benefits of the described methods and systems for joint interpretation of both MCI and multipole sonic logging data based on biaxial anisotropy models include real-time fracture detection and quantification, with reduced characterization uncertainty.

Example System

Figure 10:
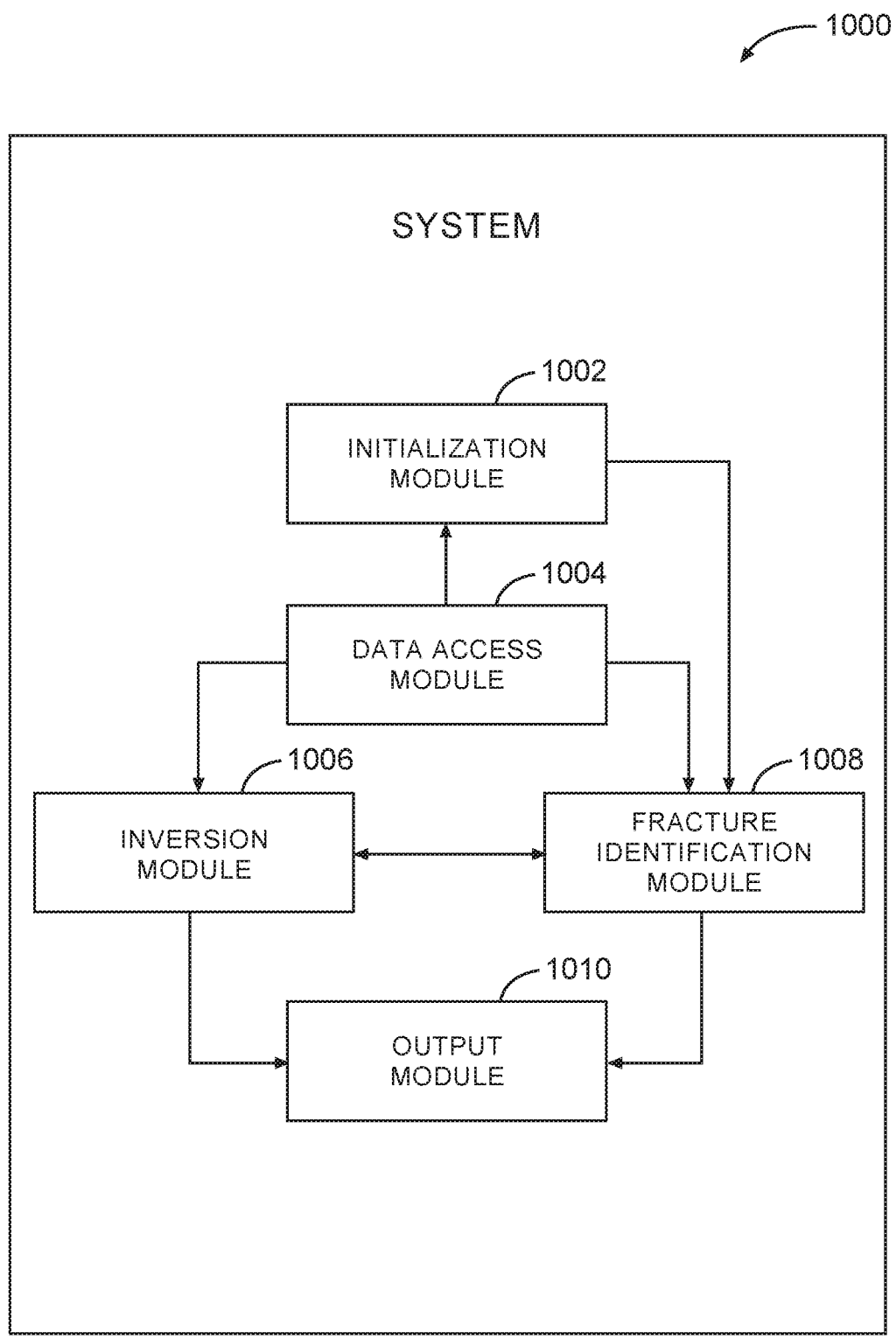
FIG. 10 is a schematic block diagram of a system for fracture interpretation, according to one or more example embodiments.

FIG. 10 is a schematic block diagram of an example system 1000 for estimating subsurface formation and invasion properties, according to an example embodiment. The example system 1000 of FIG. 10 may be configured to perform one or more of the methods described above with reference to FIG. 9. The system 1000 is described in terms of a number of modules for performing the respective operations previously described. As used herein a "module" can be an engine, logic component, or mechanism capable of performing described operations and/or configured or arranged in a certain manner. Modules may constitute either software modules, with code embodied on a non-transitory machine-readable medium (i.e., such as any conventional storage device, such as volatile or non-volatile memory, disk drives or solid state storage devices (SSDs), etc.), or hardware-implemented modules. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform the described operations.

In various embodiments, a hardware-implemented module may be implemented mechanically or electronically. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein. For example, a hardware-implemented module may include dedicated circuitry or logic that is permanently configured (e.g., within a special-purpose processor, application specific integrated circuit (ASIC), or logic array) to perform the identified operations. A hardware-implemented module may also include programmable logic or circuitry (e.g., as encompassed within a general-purpose processor or other programmable processor) that is temporarily configured by software or firmware to perform some or all of such operations.

The term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. In some embodiments, modules or components may temporarily configured (e.g., programmed); and each of the modules or components need not be configured or instantiated at any one instance in time. For example, where the modules or components include a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

For purposes of the present description, the modules of FIG. 10 will be described in terms of the algorithms executed in each module, as may be executed by one or more processors, general purpose computer or other mechanism based on instructions stored in hardware in accordance with the description above.

In this example embodiment, the system 1000 includes a data access module 1004 configured to access MCI and MSL measurement data from an initialization module 1002, such as receiving input of MCI and sonic logging data as previously described in paragraphs [0084] and [0087], respectively. An inversion module 1006 is configured to perform inversion in accordance with one or more of the example embodiments discussed with reference to FIG. 9, while a fracture identification module 1008 is configured to identify and characterize one or more fractures based on results of the inversion, according to the fracture identifications schemes and/or formulas discussed above. In some embodiments, the inversion module 1006 can be configured to perform the inversion processing in the manner described in paragraph [0086]. After inversion processing, the fracture identification module 1008 can performs=fracture characterization as described in paragraph [0089]. The system 1000 further comprises an output module 1010 configured to deliver the estimated measurement zone parameters. The output module 1010 may in some embodiments deliver numerical tables with estimated values for the invasion depth, formation resistivity, and invasion resistivity at multiple different points along a borehole. In other embodiments, a graphical plot that maps the estimated values to the borehole positions may be printed in hard copy, and/or may be displayed on a display screen (e.g., video display unit 1110 as further described below in reference to FIG. 11).

Example Machine Architecture and Machine-Readable Medium

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Figure 11:
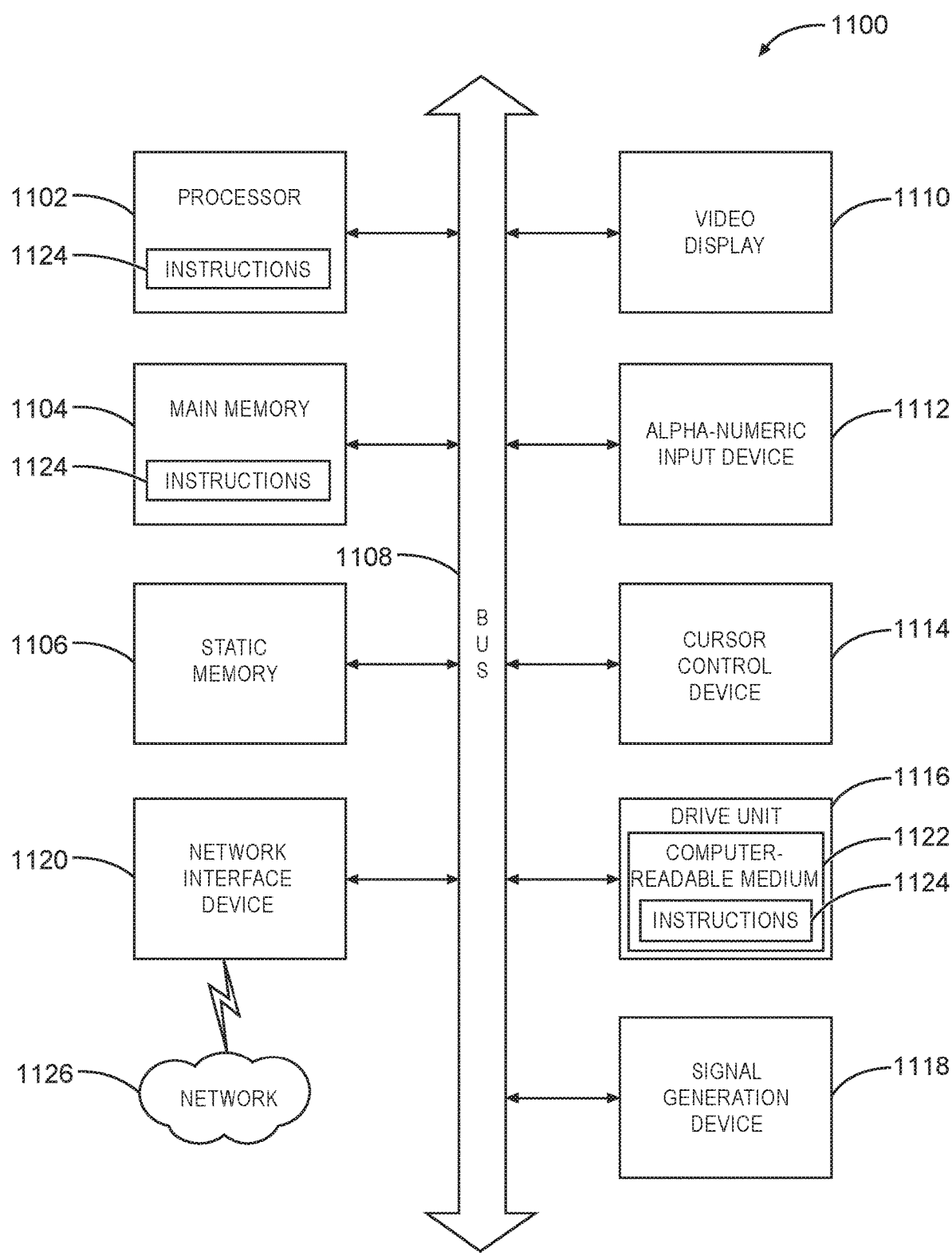
FIG. 11 is a diagrammatic representation of a machine in the example form of a computer system within which a set of instructions for causing the machine to perform a method for fracture interpretation may be executed, according to one or more example embodiments.

FIG. 11 is a diagrammatic representation of a machine in the example form of a computer system 1100 within which a set of instructions 1124 may be executed for causing the machine to perform any one or more of the methodologies discussed herein. For example, the surface computer system 366 (FIG. 3) or any one or more of its components may be provided by the system 1100.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alpha-numeric input device 1112 (e.g., a keyboard), a cursor control device 1114 (e.g., a mouse), a disk drive unit 1116, a signal generation device 1118 (e.g., a microphone/speaker) and a network interface device 1120.

The disk drive unit 1116 includes a machine-readable or computer-readable storage medium 1122 on which is stored one or more sets of instructions 1124 (e.g., software) embodying any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting non-transitory machine-readable media. The instructions 1124 may further be transmitted or received over a network 1126 via the network interface device 1120.

While the machine-readable storage medium 1122 is shown in an example embodiment to be a single medium, the term "machine-readable medium" should be taken to include a single medium or multiple media (e.g., a centralized or distributed database and/or associated caches and servers) that store the one or more sets of instructions 1124. The term "machine-readable medium" shall also be taken to include any medium that is capable of storing a set of instructions for execution by the machine and that cause the machine to perform any one or more of the methodologies of this disclosure. The term "machine-readable medium" shall accordingly be taken to include, but not be limited to, solid-state memory devices of all types, as well as optical and magnetic media.

Although this disclosure has been described with reference to specific example embodiments, it will be evident that various modifications and changes may be made to these embodiments without departing from the broader scope of the disclosure. Accordingly, the specification and drawings are to be regarded in an illustrative rather than a restrictive sense.

The following numbered examples are illustrative embodiments in accordance with various aspects of the present disclosure.

1. A method includes accessing multicomponent induction (MCI) and multipole sonic logging (MSL) data captured by measurement tools in a borehole extending through a subsurface formation; calculating, using one or more computer processors, inverted biaxial anisotropy (BA) parameters by performing an iterative inversion operation on the MCI data; performing fracture analysis, using one or more computer processors, to identify one or more fracture properties of the subsurface formation based at least in part on the MSL data and one or more of the inverted BA parameters; and operating a controlled device based at least in part on the fracture analysis.

2. The method of example 1, further including calculating, using one or more computer processors, inverted transverse isotropy (TI) parameters by performing an iterative inversion operation on the MCI data.

3. The method of either of examples 1 or 2, in which the iterative inversion operation on the MCI data using a TI formation model that represents simulated formation resistivity characteristics that account for transverse formation isotropy to resistivity.

4. The method of any of examples 1-3, in which the iterative inversion operation on the MCI data uses a BA formation model that represents simulated formation resistivity characteristics that account for transverse biaxial formation anisotropy to resistivity.

5. The method of any of examples 1-4, in which performing fracture analysis further includes identifying presence of a fracture in the formation by calculating a value of an identification function based on formation parameters calculated from the MCI and MSL data.

6. The method of any of examples 1-5, in which performing fracture analysis further includes estimating a fracture geometric parameter using a fracture formation model that represents formation resistivity characteristics in a homogeneous unbounded formation.

7. The method of any of examples 1-6, in which the identification function is variable as a function of at least one of the inverted BA parameters, an inverted TI parameter, and a parameter from the MSL data.

8. The method of any of examples 1-7, in which the performing of the BA inversion operation is based on single-frequency MCI measurement data.

9. The method of any of examples 1-8, in which the controlled device includes a display device to display one or more fracture characteristics based at least in part on the fracture analysis.

10. The method of any of examples 1-9, further including calculating, using one or more processors, a fracture strike angle based on both the MCI and MSL data.

11. The method of any of examples 1-10, further including calculating, using one or more processors, borehole corrected measurement data by processing the MCI data to correct for borehole effects.

12. The method of any of examples 1-11, further including applying a dip correction to borehole corrected measurement data.

13. The method of any of examples 1-12, in which calculating of the inverted BA parameters is based on raw MCI data, and further in which the calculating of the inverted BA parameters includes performing a set of processing operations that includes at least the BA inversion operation, the set of processing operations excluding any non-inversion operation to correct for borehole skin effects using multi-frequency MCI measurement data.

14. A system includes a data access module to access multicomponent induction (MCI) and multipole sonic logging (MSL) data captured by measurement tools in a borehole extending through a subsurface formation; and an inversion module that includes one or more computer processors to calculate inverted biaxial anisotropy (BA) parameters by performing an iterative BA inversion operation based on the MCI data; and a fracture identification module that includes one or more computer processors to identify one or more fracture properties of the subsurface formation based at least in part on the MSL data and one or more of the inverted BA parameters.

15. The system of example 14, in which the inversion module is further configured to calculate inverted transverse isotropy (TI) parameters by performing an iterative inversion operation on the MCI data using a TI formation model that represents simulated formation resistivity characteristics that account for transverse formation isotropy to resistivity.

16. The system of any of the preceding examples, in which the inversion module calculates the inverted BA using a BA formation model that represents simulated formation resistivity characteristics that account for transverse biaxial formation anisotropy to resistivity.

17. The system of any of the preceding examples, in which the fracture identification module is further configured to calculate, using one or more processors, a fracture strike angle based on both the MCI and MSL data.

18. The system of any of the preceding examples, in which the fracture identification module is further configured to calculate a value of an identification function based on formation parameters calculated from the MCI and MSL data.

19. A computer readable storage medium having stored thereon instructions for causing a machine, in response to execution of the instructions by the machine, to perform operations that include accessing multicomponent induction (MCI) and multipole sonic logging (MSL) data captured by measurement tools in a borehole extending through a subsurface formation; and calculating, in an automated procedure using one or more computer processors, inverted biaxial anisotropy (BA) parameters by performing an iterative BA inversion operation based on the MCI data and performing fracture analysis to identify one or more fracture properties of the subsurface formation based at least in part on the MSL data and one or more of the inverted BA parameters.

20. The computer readable storage medium of example 19, in which the instructions are executable to further perform operations including identifying presence of a fracture in the formation by calculating a value of an identification function based on formation parameters calculated from the MCI and MSL data.

In this description, references to "one embodiment" or "an embodiment," or to "one example" or "an example," are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, and all legal equivalents of such claims.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, disclosed subject matter lies in less than all features of a single disclosed embodiment. Thus, the following claims are hereby incorporated into the Detailed Description, with each claim standing on its own as a separate embodiment.

What is claimed is:

1. A method comprising:
   accessing multicomponent induction (MCI) and multipole sonic logging (MSL) data captured by measurement tools in a borehole extending through a subsurface formation;
   calculating, using one or more computer processors, inverted biaxial anisotropy (BA) parameters by performing an iterative inversion operation on the MCI data;
   performing fracture analysis, using one or more computer processors, to identify one or more fracture properties of the subsurface formation based at least in part on the MSL data and one or more of the inverted BA parameters;
   operating a controlled device based at least in part on the fracture analysis,
   wherein performing the fracture analysis further comprises identifying presence of a fracture in the formation by calculating a value of an identification function based on formation parameters calculated from the MCI and MSL data;
   wherein the identification function is variable as a function of the inverted BA parameters, an inverted TI parameter, and a parameter from the MSL data;
   determining if the value of the identification function meets a threshold value; and
   based upon the determination, identifying the presence of a fracture in the formation.

2. The method of claim 1, further comprising:
   calculating, using one or more computer processors, inverted transverse isotropy (TI) parameters by performing an iterative inversion operation on the MCI data.

3. The method of claim 2, wherein the iterative inversion operation is performed on the MCI data using a TI formation model that represents simulated formation resistivity characteristics that account for transverse formation isotropy to resistivity.

4. The method of claim 1, wherein the iterative inversion operation on the MCI data uses a BA formation model that represents simulated formation resistivity characteristics that account for transverse biaxial formation anisotropy to resistivity.

5. The method of claim 1, wherein performing fracture analysis further comprises estimating a fracture geometric parameter using a fracture formation model that represents formation resistivity characteristics in a homogeneous unbounded formation.

6. The method of claim 1, wherein the performing of the BA inversion operation is based on single-frequency MCI measurement data.

7. The method of claim 1, wherein the controlled device comprises a display device to display one or more fracture characteristics based at least in part on the fracture analysis.

8. The method of claim 1, further comprising:
   calculating, using one or more processors, a fracture strike or an azimuth angle based on both the MCI and MSL data.

9. The method of claim 1, further comprising:
   calculating, using one or more processors, borehole corrected measurement data by processing the MCI data to correct for borehole effects.

10. The method of claim 9, further comprising: applying a dip-effect correction to borehole corrected measurement data.

11. The method of claim 1, wherein calculating of the inverted BA parameters is based on raw MCI data, and further wherein the calculating of the inverted BA parameters comprises performing a set of processing operations that comprises at least the BA inversion operation, the set of processing operations excluding any non-inversion operation to correct for borehole effects using multi-frequency MCI measurement data.

12. A system comprising:
    a data access module to access multicomponent induction (MCI) and multipole sonic logging (MSL) data captured by measurement tools in a borehole extending through a subsurface formation; and
    an inversion module that comprises one or more computer processors to calculate inverted biaxial anisotropy (BA) parameters by performing an iterative BA inversion operation based on the MCI data; and
    a fracture identification module that comprises one or more computer processors to identify one or more fracture properties of the subsurface formation based at least in part on the MSL data and one or more of the inverted BA parameters,
    wherein the identification comprises identifying presence of a fracture in the formation by calculating a value of an identification function based on formation parameters calculated from the MCI and MSL data;
    wherein the identification function is variable as a function of the inverted BA parameters, an inverted TI parameter, and a parameter from the MSL data;
    wherein the identification further comprises:
       determining if the value of the identification function meets a threshold value; and
       based upon the determination, identifying the presence of a fracture in the formation.

13. The system of claim 12, wherein the inversion module is further configured to calculate inverted transverse isotropy (TI) parameters by performing an iterative inversion operation on the MCI data using a TI formation model that represents simulated formation resistivity characteristics that account for transverse formation isotropy to resistivity.

14. The system of claim 12, wherein the inversion module calculates the inverted BA using a BA formation model that represents simulated formation resistivity characteristics that account for transverse biaxial formation anisotropy to resistivity.

15. The system of claim 12, wherein the fracture identification module is further configured to calculate, using one or more processors, a fracture strike or an azimuth angle based on both the MCI and MSL data.

16. A computer readable storage medium having stored thereon instructions for causing a machine, in response to execution of the instructions by the machine, to perform operations comprising:

accessing multicomponent induction (MCI) and multipole sonic logging (MSL) data captured by measurement tools in a borehole extending through a subsurface formation;

calculating, in an automated procedure using one or more computer processors, inverted biaxial anisotropy (BA) parameters by performing an iterative BA inversion operation based on the MCI data and performing fracture analysis to identify one or more fracture properties of the subsurface formation based at least in part on the MSL data and one or more of the inverted BA parameters, wherein performing the fracture analysis further comprises identifying presence of a fracture in the formation by calculating a value of an identification function based on formation parameters calculated from the MCI and MSL data;

wherein the identification function is variable as a function of the inverted BA parameters, an inverted TI parameter, and a parameter from the MSL data;

determining if the value of the identification function meets a threshold value; and based upon the determination, identifying the presence of a fracture in the formation.

\* \* \* \* \*